United States Patent [19]
Binder et al.

[11] Patent Number: 4,751,155
[45] Date of Patent: Jun. 14, 1988

[54] METHOD AND APPARATUS FOR THE PREPARATION AND INSTALLATION OF BATTERY EXPLOSION ATTENUATION MATERIAL

[75] Inventors: Richard R. Binder, Menomonee Falls; John M. Raduka, Thiensville, both of Wis.

[73] Assignee: Globe-Union Inc., Milwaukee, Wis.

[21] Appl. No.: 92,043

[22] Filed: Sep. 1, 1987

[51] Int. Cl.⁴ ............................................. H01M 2/12
[52] U.S. Cl. ...................................... 429/53; 429/57; 429/86; 29/623.1
[58] Field of Search ................. 429/53, 54, 57, 86–89, 429/82; 220/88 R, 88 A; 428/288, 920

[56] References Cited

U.S. PATENT DOCUMENTS

| | | | |
|---|---|---|---|
| 2,341,382 | 2/1944 | Jensen | 429/86 |
| 2,743,035 | 4/1956 | Fogarty | 220/88 A |
| 3,650,431 | 3/1972 | Stewart | 220/88 R |
| 4,169,918 | 10/1979 | Moore | 429/86 X |
| 4,447,508 | 5/1984 | Jensen | 429/86 X |
| 4,615,455 | 10/1986 | Tansill | 220/88 R |

Primary Examiner—Anthony Skapars
Attorney, Agent, or Firm—Andrus, Sceales, Starke & Sawall

[57] ABSTRACT

Porous compressible plastic material, effective in attenuating the explosion of combustible gases which accumulate in the head space of a storage battery, is prepared for installation by compressing the material and maintaining the compression with a releasable binding means. The compressed attenuation material is inserted into the head space of the battery and, upon release of the binding means, the material reexpands to fill the head space. Various embodiments of the general method are disclosed and each may be used with a variety of open cell and fibrous plastic materials. The releasable binder may be either a physical enclosure or a chemical adhesive, each of which is preferably releasable by dissolution in the battery electrolyte.

34 Claims, 4 Drawing Sheets

METHOD AND APPARATUS FOR THE PREPARATION AND INSTALLATION OF BATTERY EXPLOSION ATTENUATION MATERIAL

BACKGROUND OF THE INVENTION

The present invention relates to electric storage batteries or cells and, in particular, to a new method and apparatus or means for preparing and installing a porous compressible material effective in attenuating an explosion of combustible gases which accummulate in the head space of storage batteries.

As is well-known in the art, most types of electric storage batteries generate combustible gases during operation, which gases are either vented from the battery container into the atmosphere or are recombined within the battery in secondary reactions with the active materials. However, even in battery constructions which are intended to provide for the internal recombination of combustible gases, there are certain circumstances, such as inadvertent or abusive overcharge, where the recombination mechanism is ineffective and significant volumes of combustible gases will be generated.

It is also well-known that the combustible gases within the head space of a battery may be accidentally ignited and result in explosion of the battery. For many years, effective and reliable means have been sought for preventing or minimizing explosions in batteries and the hazardous effects thereof.

The ignition of combustible gases within the head space of a battery can be caused by either an internal or external ignition source. Combustible gases which are generated within a battery, if not effectively recombined, will eventually create a high enough internal pressure so they must be vented to the atmosphere. The venting is typically accomplished through the use of a simple open vent slot, a flame arrestor or a one-way relief valve, sometimes referred to as a "burp" valve.

However, should an external source of ignition breach one of the protective devices or should an ignition occur within the container, the combustible gases in the head space may explode. The concentration of gases, typically a mixture of hydrogen and oxygen, and the relatively large volume of the head space can result in an explosion which will shatter the container, cover or other components. In addition, the explosion will also often carry with it the liquid acid or other hazardous electrolyte from within the container.

Thus, it is not surprising that materials and methods for suppressing or minimizing the effects of explosions within batteries have been long sought. It is, of course, axiomatic that elimination of the open head space or substantially filling the head space with a solid material would virtually eliminate the possibility of an explosion simply because the presence of combustible gases would be eliminated. However, neither alternative is acceptable. An open head space is necessary in virtually all secondary storage batteries. First of all, the head space accomodates certain battery components, such as plate straps, intercell connectors, or terminals. In addition, in batteries which utilize free liquid electrolyte, sometimes referred to as "flooded" systems, open head space is necessary to accommodate variations in the level of the electrolyte as the battery is cycled or to provide space for acid movement under extreme conditions of use, such as abusive overcharge.

For many years, it has been known to fill the head space in a battery or cell, either partially or totally, with a porous material to inhibit the explosion of gases within the head space and quench any flame which may be formed, while still allowing the movement of gases and electrolyte through the material. For example, U.S. Pat. No. 2,341,382 discloses partially filling the head space with a loosely packed material, such as crushed stone or glass, diatomaceous earth, or glass wool. The disclosure in that patent suggests that the loosely packed filled material will not prevent the explosion of gases entirely, but by dividing the head space chamber into many minute interconnected cells, a rapid total combustion of the gases is prevented and, instead, a series of weak and inconsequential minor explosions will occur until the flame is quenched. It is believed that the general theory set forth in that patent, sometimes called the "chain termination" theory, is essentially correct and valid for a large variety of porous filler materials. However, notwithstanding the soundness of the theory and the development in the ensuing years of many improved porous materials, particularly plastics, there has been no large scale or general implementation of the technology. Thus, there still exists in the battery industry today a serious need for a material and method of utilizing it which will effectively attenuate hazardous explosions, but will otherwise not be detrimental to safe and efficient operation of the battery.

There are a number of factors which are believed to have generally inhibited or prevented the practical and useful application of explosion suppression or attenuation technology in batteries. Broadly, these factors include the creation of other hazards and detrimental effects on battery performance. As the head space of a battery is filled with a porous material, there will be a decrease in the actual remaining void volume in the head space inversely proportional to the porosity or effective void volume of the filler material. In other words, the more solids present in the filler material, the greater will be the reduction in the total head space volume filled with such material. As indicated above and particularly in flooded batteries, the loss of actual open head space volume will lessen the space available for electrolyte movement or electrolyte level variations.

It is known that high rate charging or excessive overcharge can result in vigorous gassing in many types of batteries. If the gas bubbles formed in the electrolyte cannot find ready and fairly direct channels to the battery vent openings, electrolyte may be upwardly displaced and overflow through the battery vents. This condition is known as electrolyte "pumping" and the damaging and hazardous effects of a corrosive electrolyte flowing out of a battery are obvious.

In addition, if a relatively large volume of electrolyte is drawn from the cells through wicking by a porous material in the head space or if the porous material otherwise retains the electrolyte with which it comes into contact, insufficient electrolyte may remain in the cells for proper electrochemical reaction and operation of the battery. Also, any material to be used as an attenuation material in batteries must possess certain other critically necessary physical properties. Such materials must have adequate resilience to retain their shape and to readily fill sometimes irregular shape of battery head space.

A number of porous plastic materials have been used in fuel tanks or similar containers as a means for reducing the explosion hazards. Both fibrous and cellular plastics of various kinds are disclosed in the art. U.S. Pat. No. 3,561,639 discloses the use of a single block of open cell polyurethane foam to fill the interior of a fuel tank.

Bulked fibrous plastic materials of many types have also been proposed for use as a means of arresting flames and reducing explosion hazards in fuel tanks. The filamentary plastic materials proposed for such use include polyolefins, nylon, dacron, polyesters, acrylics, and polyurethanes, as well as others. The materials are typically bulked or textured to provide high porosity and void volume by any of many well-known methods such as twisting, looping, crimping, needle punching and so forth. Examples of various types of such materials are described in U.S. Pat. Nos. 3,650,431, 4,141,460, and 4,154,357.

In the commonly-owned, copending application of Binder et al, entitled "Battery Explosion Attenuation Material and Method", there is described an improved porous plastic material which has a unique bimodal pore distribution including a major proportion of the small pores most effective in explosion attenuation and a minor porportion of large pores which are required to accommodate gas and/or electrolyte movement within and through the head space during battery operation. The unique bimodal function may be provided by using a single porous material, properly prepared and installed, or by using a composite of two different porous materials. Furthermore either filamentary or open cellular materials may be used.

The explosion attenuation material is preferably installed in the open head space of a battery cell so that it is retained therein in a somewhat compressed state, e.g. about 20% compression. Maintaining some compression on the material provides two separate benefits. If the material is maintained in compression within the head space, its inherent resilience will tend to cause it to fill the entire open volume of the head space before it has reached its free, fully expanded state. This helps assure there will be no significant open volumes within the head space which would allow an explosion of more than minor and insignificant proportions to occur. In addition, it has been shown that certain materials maintained in compression attenuate explosions better (result in lower peak pressures) than the same material in a free, uncompressed state.

The utility of the materials which have been identified as effective in attenuating explosions can be substantially enhanced by providing means for facilitating their preparation and installation and assuring that optimum performance will be attained after installation. Because the manufacture of storage batteries is fairly highly automated, it would be desirable to provide attenuation material which also could be adapted to automated installation. However, the convenience of automated installation cannot detract from the performance of the attenuation material after installation, and, indeed, it would be most desirable if the method and apparatus used in the preparation and installation of the material actually enhanced its ultimate performance.

SUMMARY OF THE INVENTION

The present invention is directed to a method and related apparatus or means for preparing and installing an explosion attenuation material in the head space of an electric storage cell or battery. Various embodiments of the invention lend themselves to automated installation and assembly, and the methods and apparatus result in optimizing the attenuation performance of the material as installed in the head space.

In accordance with the method of the present invention, a porous compressible attenuation material is initially compressed, maintained in compression with a releasable binder, inserted into the head space while so compressed, and then allowed to expand within the head space by releasing the binder.

The attenuation material may be compressed unidirectionally, as by flat pressing, or bidirectionally, as by rolling. In either case, reducing the volume of the attenuation material by compressing it and holding it in compression, facilitates it installation into the often small and sometimes obstructed headspace in a cell or battery.

The binder used to hold the material in compression may comprise either a chemical adhesive or a physical enclosure. In either case, the binder is preferably releasable by dissolution in the liquid electrolyte used in the cell or battery. The terms "dissolution", "soluable", and variations thereof, as used herein, are intended to cover ionic solubilization of the binder, as well as chemical reactions which result in release of the binder. Sodium silicate has been found to be a particularly effective chemical binder. It is soluble in the aqueous sulfuric acid electrolyte used in lead-acid batteries, as well as certain aqueous alkaline electrolytes, and when dissolved is innocuous to the operation of either the battery or the attenuation material. The material may also be compressed by rolling or wrapping it in a confining outer layer, such as a net. Either the net or the means with which it is held closed may be made of an electrolyte-soluble material to effect release and re-expansion of the attenuation material.

The re-expansion in situ of the attenuation material after release of the binder also helps provide that substantially the entire open volume of the head space will be occupied by the material and protected. Variations in the level of compression and/or the amount of compressed material initially installed in the head space can also be used to help provide that the re-expanded material is retained within the head space at some residual level of compression or, in other words, is not allowed to re-expand fully. This can enhance the material's effectiveness in attenuation as well.

DETAILED DESCRIPTION OF THE PREFERRED EMBODIMENTS

Figure 1:
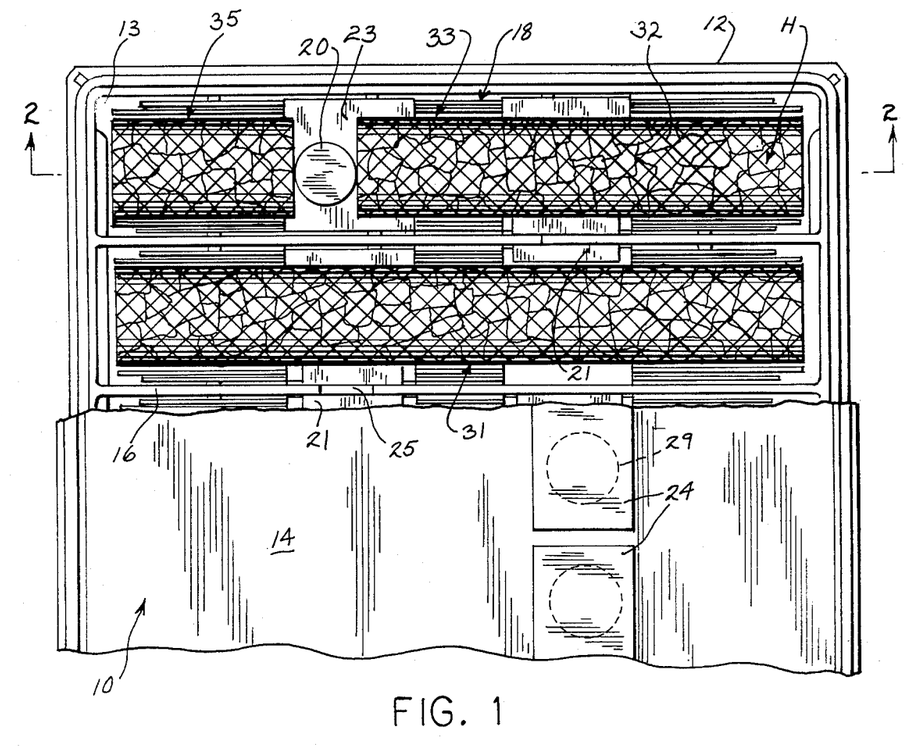
FIG. 1 is a top plan view of a multicell storage battery with a portion of the cover broken away to show initial installation in the head space of the cells of the explosion attenuation material prepared in accordance with the preferred embodiment.
Figure 2:
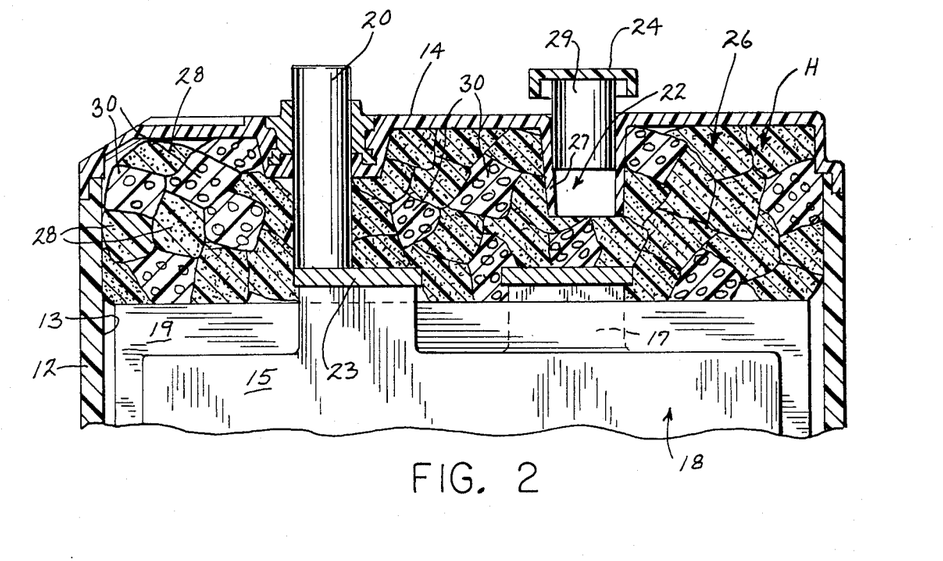
FIG. 2 is a vertical section through the end cell of the battery taken on line 2—2 of FIG. 1, but showing the attenuation material after release and expansion within the head space.

Referring to FIGS. 1 and 2, a storage battery 10 includes the container 12 and cover 14. The container and cover are typically made of injection molded polypropylene and have average wall thickness of about 0.1 inch. The container 12 is divided into a series of cells 13 by integrally molded intercell partitions 16. Each cell contains an electrode element 18 constructed of a stack of alternating positive and negative plates 15 and 17 spaced apart by insulating separators 19, all in a manner well known in the art. The electrode elements 18 within each cell also include the typical lug 21 and strap 23 connectors, and the lugs of adjacent electrodes are series connected through the cell partition 16 with appropriate conductive intercell connectors 25, all comprising conventional constructions well known in the art. The end cells of the battery 10 also include connection to the exterior terminal post 20 which extends upwardly through the cover 14.

The cover 14 includes a series of vent/fill holes 22 defined by downwardly extending vent barrels 27, one for each cell 13. The vent/fill holes 22 are closed with vent cap assemblies 24 which may be fixed or removable. The vent cap assemblies 24 typically include downward depending vent plugs 29 which seat in the vent barrels 27 and substantially seal the holes 22, but are provided with small passages to allow gases generated within the cell to vent to the atmosphere. The vent assembly 24 may typically include a microporous flame arrester adjacent each hole 22 through which gases may vent, but which is intended to prevent an external flame or ignition source from propagating back into the cell of the battery. The foregoing construction is typical and various of the elements need not be shown for an understanding of the invention.

In the assembly of a typical lead-acid battery of the foregoing construction, the assembled electrode elements 18 are placed in the cells 13 of the battery, the intercell connections 25 between adjacent electrode elements 18 are made through the partitions 16 (and, depending on the type, the terminal connections may also be made), and the cover 14 is sealed to the container 12. Each of the cells is filled with a sulfuric acid electrolyte to a level slightly above the tops of the electrode elements 18 and the battery is formed by electrochemically converting lead oxide and lead sulfate material in the positive and negative plates 15 and 17 to lead dioxide and lead, respectively.

Except for the space occupied by the plate straps 23, lugs 21, terminal post 20, and vent barrels 27, the space within each cell above the top of the electrode element 18 and below the underside of cover 14 is generally open. This open head space, designated generally by the letter H in FIGS. 1 through 4, but shown occupied by the various embodiments of attenuation material to be hereinafter described, may have a volume of 20 to 25 cubic inches (325 to 410 cubic centimeters) per cell in a typical 6-cell 12 volt battery.

The hydrogen and oxygen gases, which are generated as a result of the electrochemical reactions within the cell, pass upwardly through the electrolyte, between the plates 15 and 17 and separators 19 of the electrode element 18 and accumulate in the head space H, until a sufficient positive pressure is established to cause the gases to vent through the vent holes 22 and past the flame arrestors or other venting construction in the vent caps 24. The gas mixture is, of course, highly explosive and, as is well known, an ignition of such gases accumulating in the open head space may result in an explosion which can easily shatter the container and/or cover, as well as other elements connected thereto. In addition to destroying the battery, the potential personal danger from exploding battery pieces and acid electrolyte is well known. Because of the need to accommodate certain structural components of the battery and to provide space for electrolyte level fluctuations, the head space in batteries must be maintained.

Figure 3:
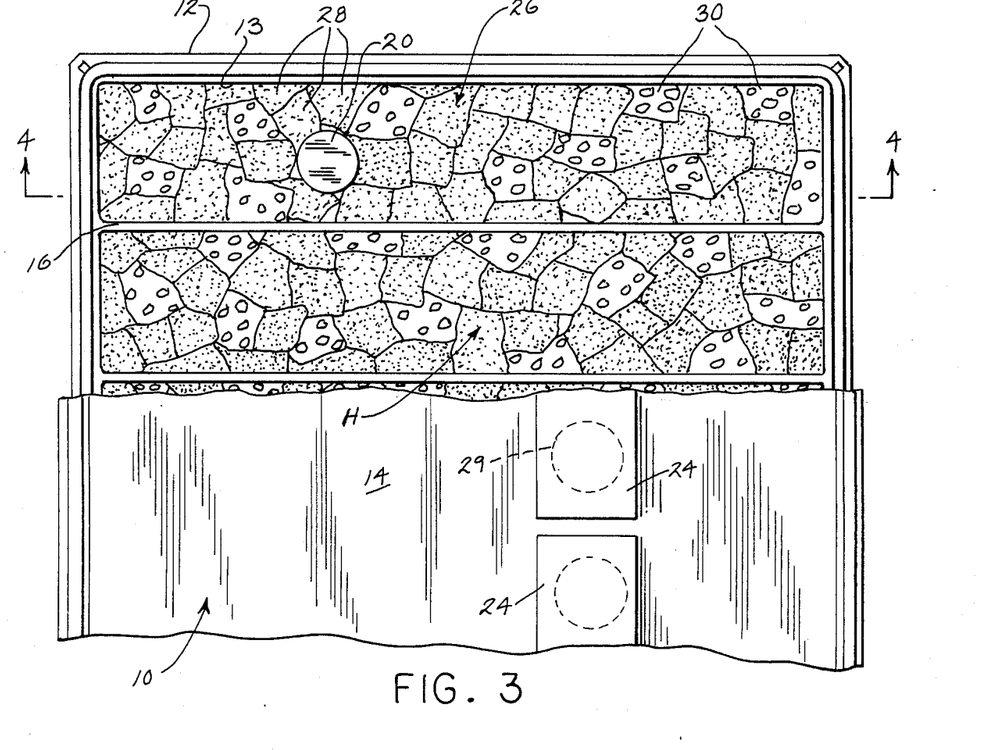
FIG. 3 is a top plan view of a storage battery, similar to FIG. 1, showing a similar attenuation material within the head space which is prepared and installed in an alternate manner.

In the preferred embodiment of the attenuation material described in the above-identified copending application, the bimodal pore distribution which is necessary for effective attenuation and gas/electrolyte management, is provided in a composite of two different types of open cell polyurethane foam materials. Referring particularly to FIGS. 2 and 3, the composite attenuation material 26 is comprised of small, randomly oriented small pore pieces 28 and large pore pieces 30. The small pore pieces 28 are most effective in the attenuation of explosions and the large pore pieces 30 provide the open space for back flow of the electrolyte and movement of the exiting gases to the vent holes 22.

The composite bimodal pore material 26 may utilize cut or chopped pieces of the foam materials 28 and 30 of any convenient size or shape. The composite material, in a random distribution of pieces, should be loaded into the open head space H of each battery cell in a manner which will assure that the head space is substantially completely filled with the material 26. These polyurethane foams are highly compressible and resilient and, therefore, inserting the material into the head space under some precompression and allowing it to expand within the head space will help assure complete filling. Using smaller pieces 28 and 30 also enhances complete filling. Foam pieces nominally ½ inch in size have been found to work satisfactorily.

Various methods may be used to prepare the composite attenuation material for loading into the head space of a battery and to facilitate its loading and proper ultimate positioning therein. In the preferred embodiment shown in FIGS. 1, 5 and 6, an appropriate blend of large and small pore foam pieces 28 and 30 may be compressed and rolled into a cylindrical shape and retained in compression by a mesh or net 32 of suitable material, such as nylon. A cylinder 31 of compressed composite material is placed in the head space of each cell over the electrode element 18 prior to placing the cover 14 on the container 12. The nylon net 32 is soluable in sulfuric acid and will dissolve in a short time after the battery is filled with electrolyte. Dissolution of the net will result in expansion of the compressed composite material to substantially fill the head space. By appropriately controlling the size of the compressed cylinder 31 and the degree of compression of the porous material, in consideration of the size of the head space to be filled, substantial variations in the compression with which the material is ultimately held in the head space may be attained.

As may be seen in FIG. 1, the cylinders 31 of the compressed attenuation material are readily insertable into each cell 13 of the open container 12. Upon dissolution of the net 32 or other releasable binder by which the material is held in compression, the material must expand (or reexpand) to a volume which will substantially completely fill the head space within the cell, as shown by the attenuation material 26 in FIGS. 2 and 3. The biaxial compression of the attenuation material which is effected by rolling the material into the cylinders 31 will result in a corresponding biaxial expansion as the enclosing net 32 is released within the cell. The biaxial expansion of the material is most helpful to insure both vertical (FIG. 2) and horizontal (FIG. 3) expansion into all portions of the head space. It is particularly important that the attenuation material expand around and between the various irregularly shaped components which lie in or extend through the head space, such as the terminal post 20, lugs 21, straps 23, or vent barrels 27.

Referring particularly to FIG. 1, the cylinder 31 of compressed attenuation material 26 may be conveniently divided into two shorter cylinders 33 and 35 for insertion in the end cell 13 containing the vertical terminal post 20. Otherwise, the use of a cylinder 31 of the full length of the cell would require it to be squeezed between the post 20 and the cell partition 16 or end wall of the container 12 in a manner not condusive to automated assembly.

Although the nylon net 32 is readily soluable in the aqueous sulfuric acid electrolyte used in lead-acid batteries, it may be desirable to limit the amount of dissolved organic material contributed to the electrolyte as the net dissolves. To limit the amount of potentially soluable organic matter, the net may alternately be made of an insoluable plastic, such as polypropylene, which may be stitched to enclose the compressed attenuation material with a soluable stitching, such as nylon. Electrolyte-soluable adhesives might also be appropriately used.

If a net 32 of soluable nylon is used, it may be most conveniently sealed around the compressed attenuation material with a simple heat seal. Thus, the overlapping edges of confining net may be melted together.

A chemical adhesive may also be employed as the means for binding the attenuation material in a cylindrical shape. For example, the composite material 26 comprising polyurethane foam pieces 28 and 30 is saturated with an aqueous solution of sodium silicate, pressed into a rigid confining cylindrical tube, and dried to set the sodium silicate. The sodium silicate binder will hold the compressed rods of attenuation material after they are removed from the tube in which they are formed. Otherwise, the adhesive-bound cylinders of attenuation material are inserted into the cells in a manner similar to the net-bound material described above. Sodium silicate is readily soluable in dilute sulfuric acid and is well-known to be innocuous to the operation of a lead-acid battery.

The biaxially compressed material, whether retained with a net or other confining outer layer or a chemical adhesive, may, of course, be made directly to the length of the cell in which it is to be inserted, or in longer lengths which may be cut to appropriate size. In any case, the compressed rods or cylinders of attenuation material may be adapted to automated assembly in which they are serially or simultaneously dropped or otherwise inserted into the cells of the battery. As noted above, adjustments in an automated installation process may be required for the end cells of the battery which contain vertical terminal posts. In one such process adjustment, full cell length cylinders 31 of compressed attenuation material may be made in much smaller diameters, for example, ½ or less the diameter of the cylinder 31 shown in FIG. 1. Two such smaller diameter cylinders are inserted into each cell 13 and in the end cell, the cylinders are conveniently disposed on opposite sides of the terminal post 20. Such an orientation would also avoid interference from the downwardly depending vent barrel 27 as the cover 14 is placed on the container after installation of the attenuation material.

A composite type of attenuation material, may be alternately prepared and installed as will be hereinafter described with reference particularly to FIGS. 4, 7, and 8. A blend of randomly oriented pieces 28 and 30 of attenuation material is spread in a thin continuous layer, wetted with a solution of a binder (such as aqueous sodium silicate), compressed unidirectionally between two opposing surfaces, and allowed to dry while maintained in compression. The resulting mat 34 of composite material is held together and in a compressed state by the sodium silicate binder, as previously described. The mat is formed in a manner similar to the well-known "rebonding" process which is used, for example, to make carpet padding from scrap plastic foam material. Typically, the thin layer of composite pieces 28 and 30 is pressed between flat surfaces including an open mesh network 36 to facilitate the removal of excess binder solution and the subsequent drying of the material.

The attenuation material is typically compressed and held by the binder to a volume of ½ to ⅓ its volume in a free, uncompressed state. Pieces of the rebonded composite material are cut from the mat 34 to sizes which can be conveniently inserted into the open cells of a battery container. The amount of compressed material actually installed depends largely on the state of compression in which it is held. But, in any event, must be at least adequate to expand, upon dissolution of the binder, to substantially fill the head space H. Thus, after expansion, the attenuation material should fill the head space in a manner similar to that described with respect to the biaxially compressed or rolled cylinders 31, and shown in FIGS. 2 and 3.

For example, a rebonded composite mat 34 was prepared and installed as follows.

The foam pieces 28 and 30 in nominally ½ inch cubes were laid out to a depth of about 1 inch, wetted with an aqueous solution of sodium silicate containing about 15 to 25% sodium silicate by weight, compressed to a thickness of about ⅜ inch and dried. The pieces were cut to essentially the plan dimensions of the cell and two layers 38 of the pieces were placed in each cell. Since the compression of the material is unidirectional (vertically with respect to the position in FIG. 4), reexpansion of the material will also be primarily in the same direction. The original uncompressed thickness of the two layers 38 described above was 2 inches and, assuming substantially complete reexpansion within the head space, would substantially fill a head space with a 2 inch vertical dimension. However, it is desirable to install more attenuation material than would be needed to fill the head space in a substantially uncompressed state. In other words, it is preferable that complete reexpansion of the material be limited by the confines of the head space such that the material is ultimately maintained in some compression. This helps assure that the material will expand into the sometimes small and irregular spaces created by other components occupying a portion of the head space. Also, it is known that attenuation material held in some state of compression operates more effectively than the same material in a free, uncompressed state.

Figures 5, 6, 8:
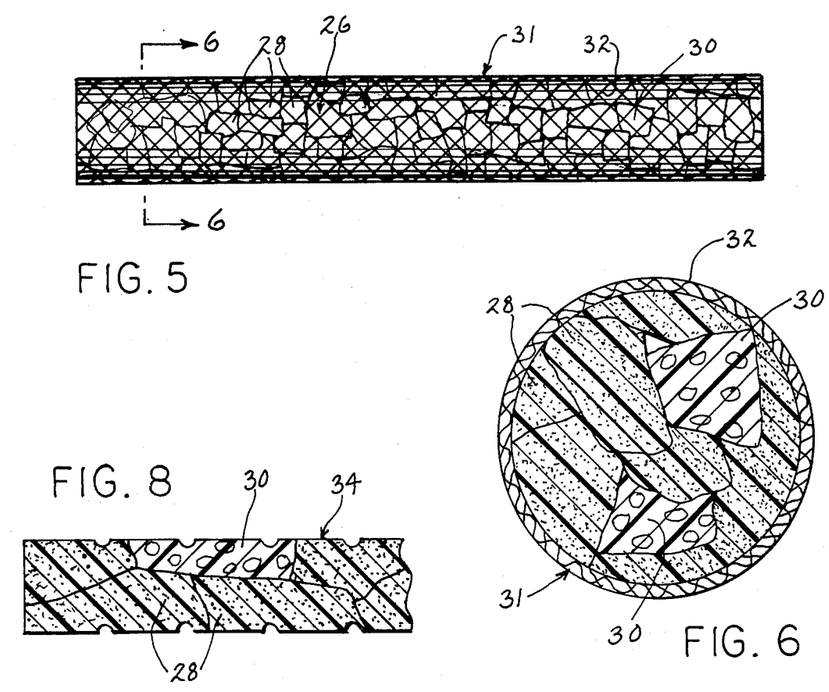
FIG. 5 shows a single cylinder of the attenuation material compressed and bound in accordance with the method and apparatus of the preferred embodiment.
FIG. 6 is a vertical section taken on line 6—6 of FIG. 5.
FIG. 8 is an enlarged sectional view taken on line 8—8 of FIG. 7.

Dissolution of the binder with which the pieces 28 and 30 of the composite material layers 38 are held together results in reexpansion similar to that occurring with the biaxially compressed cylinders of attenuation material previously described with respect to FIGS. 1, 5 and 6. Thus, the reexpanded material will position itself within the head space in the manner shown in FIGS. 2 and 3.

Figure 4:
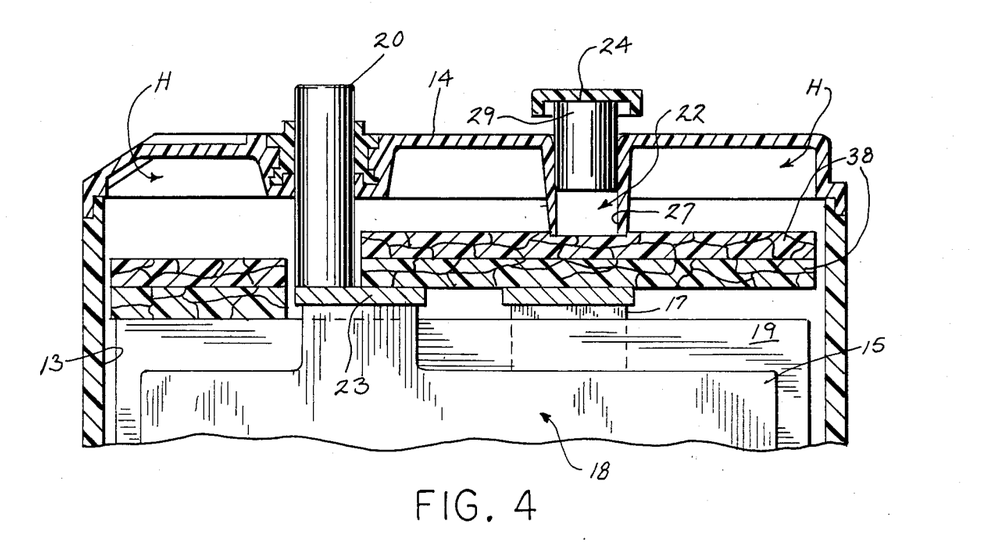
FIG. 4 is a vertical section through the ends of the battery, taken on line 4—4 of FIG. 3, but showing the attenuation material prior to release of the binder and reexpansion.
Figure 7:
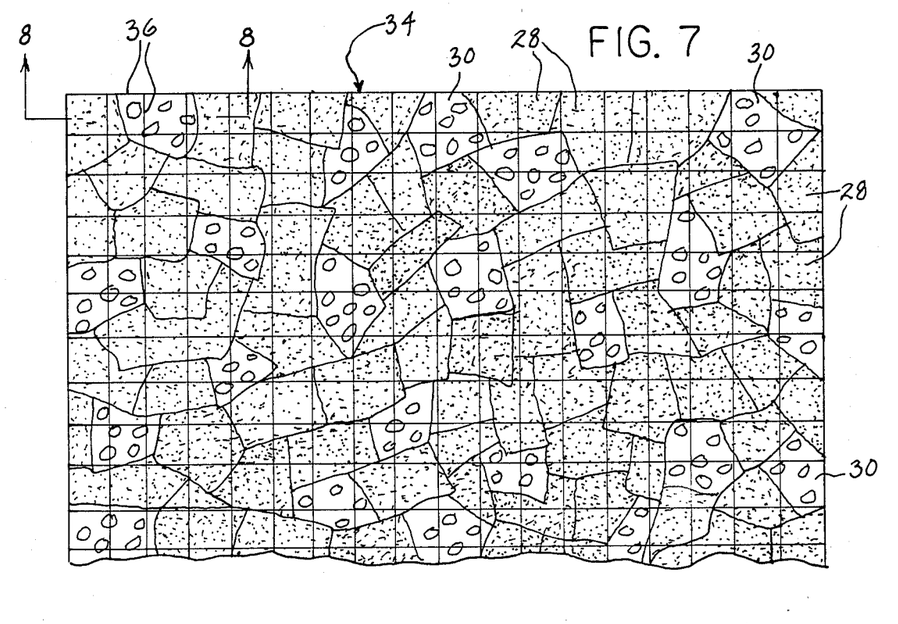
FIG. 7 is a top plan view of a mat of the rebonded material from which are cut the pieces shown initially installed in FIG. 4.
Figure 9:
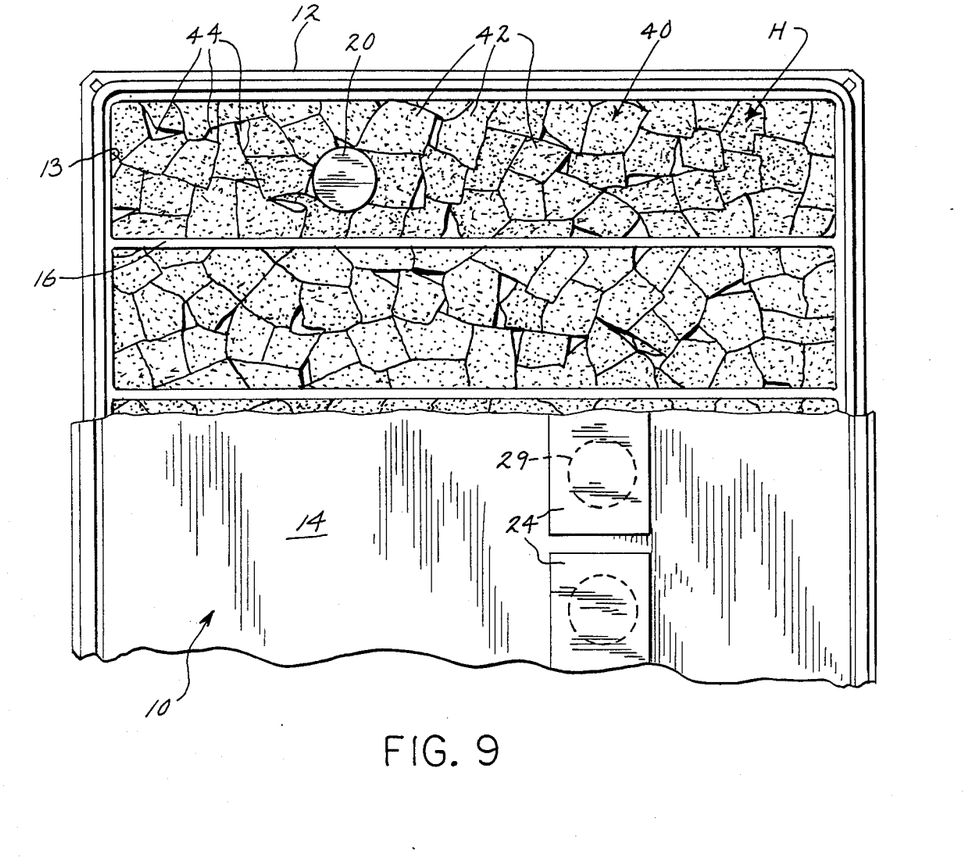
FIG. 9 is a top plan view, similar to FIGS. 1 and 3, showing the installation of and attenuation material prepared in accordance with another embodiment.

FIG. 9 shows positioned within the head space of the cells of the battery an attenuation material prepared similarly to that shown and described with respect to FIGS. 4, 7 and 8, but from a different type of material. The individual pieces 42 of the material are made from a single type of porous, compressible plastic material which, as described in detail in the previously identified, copending application, may be either an open cell or fibrous material. The bimodal pore function, however, is provided by the open spaces or channels 44 between the randomly oriented pieces 42.

The attenuation material 40 is prepared in a manner similar to the composite mat 34 shown in FIG. 7. For example, unitary sheets of a small pore polyurethane foam are wetted with a sodium silicate solution having a concentration of approximately 20% by weight sodium silicate. The wetted sheets are compressed and dried in a manner similar to that described with respect to the composite mat of FIG. 7. The compressed and bound sheets are then chopped into conveniently sized pieces (nominally ⅛ inch pieces have been found to work satisfactorily). The pieces are poured into the open head space H of the cells 13 on top of the electrode elements 18 and other related components. Any excess pieces 42 may be conveniently brushed off at the level of the top of the container 12 prior to sealing or otherwise affixing the cover 14 thereto. The cells may then be filled with electrolyte through the vent/fill openings 22, causing the sodium silicate binder to dissolve and the pieces 42 to expand and fill the head space. In some cases, complete dissolution of the binder and reexpansion of the attenuation material may be facilitated by the formation process. The vigorous gassing and movement of the electrolyte through the head space which typically occurs during formation helps provide complete dissolution of the binder.

Although the foregoing methods for preparing and installing an attenuation material have been described primarily with respect to the utilization of an open cell polyurethane foam, bulk fibrous materials of various types, including a number of polyolefin and polyester fibers, may be used with any of the installation methods described. For example, small pieces or pillows of lofted, non-woven polypropylene fibers could be: (1) compressed by rolling into cylinders and bound with a soluble net; (2) compressed and bound into a rebounded mat; or, (3) cut from a unitary compressed and bound mat. Thus, apart from the difference in material, the preparation and installation is essentially the same as in the embodiments described in detail above.

Regardless of which of the foregoing methods and apparatus are used for the preparation and installation of attenuation materials and also regardless of the type of attenuation material used, the present invention provides wide flexibility and adaptability which helps insure both effective ultimate explosion attenuation and relative ease of installation of the material into the batteries. Thus, by controlling carefully the volume of attenuation material selected for installation in a head space of a given volume the actual amount of residual compression by which the material, after reexpansion, is held within the confines of the head space may be quite accurately controlled. Control of the compression with which the attenuation material is ultimately held can provide two distinct benefits. First, by utilizing a greater volume of attenuation material than needed, in its free and compressed state, to fill the head space, there is greater likelihood that the material will expand to substantially fill all of the irregular spaces within the head space. Substantially complete filling is important to help eliminate any unoccupied volumes of head space large enough to allow the development therein of potentially damaging high pressure resulting from gas ignition. Also, maintaining the attenuation material at some level of residual compression within the head space enhances its effectiveness. Residual compression has the practical effect of reducing the pore size of the porous material and, all other factors being equal, the smaller the pore size of the material, the better its performance in the attenuation of explosions.

Various modes of carrying out the invention are contemplated as being within the scope of the following claims particularly pointing out and distinctly claiming the subject matter which is regarded as the invention.

We claim:

1. In an electric storage cell or battery of the type having a normally open head space in each cell above the electrode element and electrolyte and below the cell cover, the method of installing an explosion attenuation material comprising the steps of:
   (1) selecting a porous compressible attenuation material;
   (2) compressing the material;
   (3) maintaining the material in compression with a releasable binding means;
   (4) inserting the material into the head space; and
   (5) releasing the binding means and allowing the material to expand within the head space.

2. The method as set forth in claim 1 wherein the attenuation material is selected in an amount sufficient in a substantially uncompressed state to fill the head space and is compressed to a volume less than the volume of the head space.

3. The method as set forth in claim 1 wherein the porous compressible material comprises a fibrous or open cell plastic.

4. The method as set forth in claim 3 wherein the material is selected from the group comprising polyolefins, polyurethanes and polyesters.

5. The method as set forth in claim 2 wherein the material comprises randomly oriented pieces of a fibrous or open cell plastic.

6. The method as set forth in claim 5 wherein the material is compressed into a cylindrical shape.

7. The method as set forth in claim 4 wherein the binding means is soluable in the electrolyte.

8. The method as set forth in claim 3 wherein the binding means is released by dissolution.

9. The method as set forth in claim 6 wherein the material is compressed to a volume in the range of ½ to ⅓ its uncompressed state.

10. The method as set forth in claim 5 wherein the amount of material selected in step (1) exceeds in its uncompressed state the volume of the head space.

11. The method as set forth in claim 10 wherein the expansion of the material in step (5) is restricted by the confines of the head space to about 80% to 95% of its uncompressed volume.

12. The method as set forth in claim 6 wherein step (2) comprises rolling the material within a confining outer layer.

13. The method as set forth in claim 12 wherein the confining outer layer comprises the releasable binding means.

14. The method as set forth in claim 13 wherein the material comprises a composite of two types of plastic materials.

15. The method as set forth in claim 13 wherein the releasable binding means comprises a net.

16. The method as set forth in claim 15 wherein the net is soluable in the electrolyte.

17. The method as set forth in claim 16 wherein the net is made of nylon.

18. The method as set forth in claim 3 wherein the material comprises randomly oriented pieces.

19. The method as set forth in claim 18 including the steps of:
   (a) prior to the step of compressing, wetting the material with a solution of the binding means;
   (b) compressing the material into a mat of contiguous pieces;
   (c) during the step of maintaining the compression, drying the material to set the binding means and to provide a rebonded mat of material; and,
   (d) prior to the step of inserting, cutting the rebonded mat to sizes sufficient in a substantially uncompressed state to fill the head space.

20. The method as set forth in claim 19 wherein the binding means comprises sodium silicate and the solution is an aqueous solution.

21. The method as set forth in claim 20 wherein the material comprises a composite of two types of plastic materials.

22. The method as set forth in claim 3 wherein the selected material is in sheet form and including the steps of:
   (a) prior to the step of compressing, wetting the sheet material with a solution of the binding means;
   (b) during the step of maintaining the compression, drying the sheet material to set the binding means; and,
   (c) prior to the step of inserting, cutting the sheet material into small pieces.

23. The method as set forth in claim 22 wherein the solution of the binding means is an aqueous solution of sodium silicate.

24. The method as set forth in claim 22 including, after the step of inserting the material, the step of attaching the cover to the cell.

25. In an electric storage cell including a container, electrode elements and an electrolyte disposed within the container, a container cover, a head space within the container above the elements and electrolyte and below the cover, vent means in the cover for the release of gases generated by electrochemical reactions within the cell, and a porous compressible plastic explosion attenuation material substantially filling the head space, means for facilitating the installation of the attenuation material in the head space comprising a releasable binder holding the material in an initial compressed state wherein its volume is less than the volume of the head space, and means within the cell for effecting release of the binder and expansion of the material within the head space.

26. The invention as defined in claim 25 wherein the binder is dispersed throughout the material.

27. The invention as defined in claim 26 wherein the binder comprises sodium silicate.

28. The invention as defined in claim 26 wherein the binder is soluable in the electrolyte and the electrolyte comprises the means for effecting release.

29. The invention as defined in claim 25 wherein the binder comprises a confining outer layer surrounding the material.

30. The invention as defined in claim 29 wherein the confining outer layer comprises a net.

31. The invention as defined in claim 29 wherein the confining outer layer is soluable in the electrolyte and the electrolyte comprises the means for effecting release.

32. The invention as defined in claim 30 wherein the net comprises a layer of finite length wrapped around the material and means for securing the net in its wrapped state.

33. The invention as defined in claim 32 wherein the net is insoluable and the securing means is soluable in the electrolyte.

34. The invention as defined in claim 33 wherein the net is made of polypropylene and the securing means is made of nylon.

* * * * *